United States Patent
Jales Costa et al.

(10) Patent No.: US 11,479,147 B2
(45) Date of Patent: Oct. 25, 2022

(54) VEHICLE OCCUPANCY MANAGEMENT SYSTEMS AND METHODS

(71) Applicant: Ford Global Technologies, LLC, Dearborn, MI (US)

(72) Inventors: Bruno Sielly Jales Costa, Dearborn, MI (US); Madeline J. Goh, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 223 days.

(21) Appl. No.: 16/634,410

(22) PCT Filed: Jul. 31, 2017

(86) PCT No.: PCT/US2017/044743
§ 371 (c)(1),
(2) Date: Jan. 27, 2020

(87) PCT Pub. No.: WO2019/027433
PCT Pub. Date: Feb. 7, 2019

(65) Prior Publication Data
US 2020/0171977 A1 Jun. 4, 2020

(51) Int. Cl.
*B60N 2/00* (2006.01)
*B60R 11/04* (2006.01)
*G06V 20/59* (2022.01)
*G06V 40/16* (2022.01)

(52) U.S. Cl.
CPC .............. *B60N 2/002* (2013.01); *B60R 11/04* (2013.01); *G06V 20/593* (2022.01); *G06V 40/172* (2022.01)

(58) Field of Classification Search
CPC ....... B60N 2/002; B60R 11/04; B60R 25/002; B60R 25/305; G06K 9/00288; G06K 9/00838
See application file for complete search history.

(56) References Cited

U.S. PATENT DOCUMENTS

| | | | |
|---|---|---|---|
| 5,531,472 A * | 7/1996 | Semchena | G07C 5/0891 348/148 |
| 2004/0186642 A1 | 9/2004 | Basir et al. | |
| 2010/0087990 A1 | 4/2010 | Allen | |
| 2014/0297220 A1 * | 10/2014 | Raffa | B60N 2/002 702/150 |
| 2016/0165337 A1 * | 6/2016 | Trestain | G10K 11/004 381/387 |
| 2016/0301698 A1 | 10/2016 | Katara et al. | |
| 2016/0316237 A1 * | 10/2016 | Couleaud | G06V 10/141 |

(Continued)

OTHER PUBLICATIONS

International Search Report of the International Searching Authority for PCT/US2017/044743 dated Oct. 17, 2017.

*Primary Examiner* — Md K Talukder
(74) *Attorney, Agent, or Firm* — Brandon Hicks; Eversheds Sutherland (US) LLP

(57) ABSTRACT

Example vehicle occupancy management systems and methods are described. In one implementation, a method receives a current vehicle image representing a current interior of a vehicle. An occupancy management system detects at least one passenger in the vehicle based on the current vehicle image and determines a seating location of the passenger. A seat map is generated that identifies the seating location of the passenger in the vehicle.

14 Claims, 8 Drawing Sheets

(56) References Cited

U.S. PATENT DOCUMENTS

| | | | |
|---|---|---|---|
| 2016/0381412 A1* | 12/2016 | Couleaud | H04N 21/41422 |
| | | | 725/46 |
| 2018/0236975 A1* | 8/2018 | Myers | G06V 40/193 |
| 2018/0272977 A1* | 9/2018 | Szawarski | B60N 2/0244 |
| 2018/0308236 A1* | 10/2018 | Jales Costa | G06T 7/11 |
| 2020/0047641 A1* | 2/2020 | D'Eramo | B60N 2/002 |
| 2020/0171977 A1* | 6/2020 | Jales Costa | B60N 2/002 |
| 2020/0393835 A1* | 12/2020 | Gregg | G01C 21/3438 |

* cited by examiner

VEHICLE OCCUPANCY MANAGEMENT SYSTEMS AND METHODS

TECHNICAL FIELD

The present disclosure relates to vehicular systems and, more particularly, to systems and methods that manage occupants in a vehicle.

BACKGROUND

Automobiles and other vehicles provide a significant portion of transportation for commercial, government, and private entities. Vehicles, such as autonomous vehicles, drive on roadways, parking lots, and other areas when transporting passengers or objects from one location to another. An example application of autonomous vehicles is operating as a taxi or shuttle service that picks up one or more passengers in response to a transportation request. When operating as a taxi or shuttle service, the autonomous vehicle drives to a pickup location such that one or more passengers requesting the service can enter the vehicle. The vehicle then drives to one or more destinations and allows the one or more passengers to exit the vehicle.

When an autonomous vehicle is operating as a taxi or shuttle service, it is important to manage the vehicle's occupancy. For example, the autonomous vehicle needs to know which seats are occupied and how many additional passengers can enter the vehicle. Additionally, the autonomous vehicle may want to determine that a correct passenger exits the vehicle at the appropriate destination.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
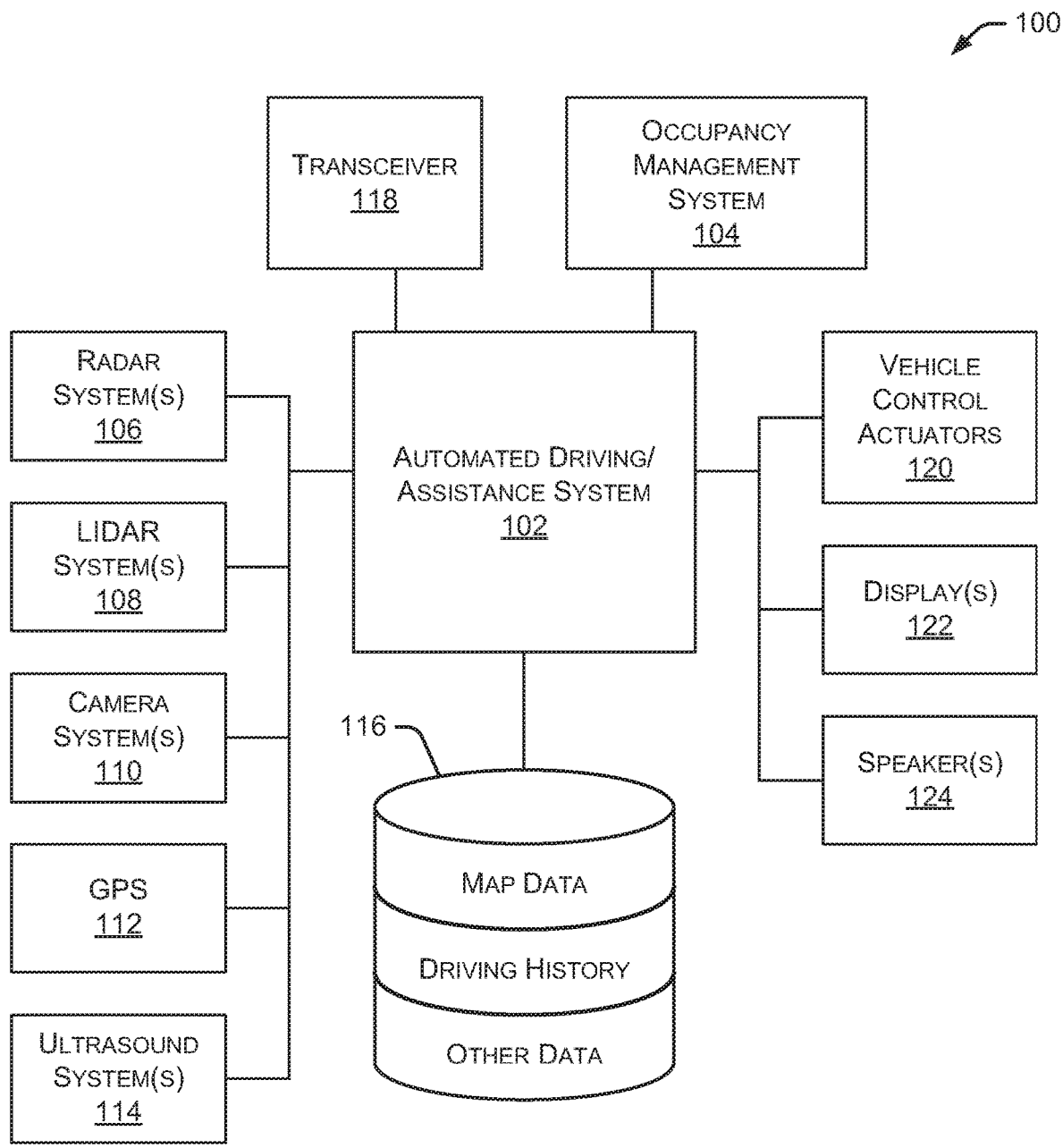
FIG. 1 is a block diagram illustrating an embodiment of a vehicle control system that includes an occupancy management system.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram illustrating an embodiment of a vehicle control system 100 within a vehicle that includes an occupancy management system 104. An automated driving/assistance system 102 may be used to automate or control operation of a vehicle or to provide assistance to a human driver. For example, the automated driving/assistance system 102 may control one or more of braking, steering, seat belt tension, acceleration, lights, alerts, driver notifications, radio, vehicle locks, or any other auxiliary systems of the vehicle. In another example, the automated driving/assistance system 102 may not be able to provide any control of the driving (e.g., steering, acceleration, or braking), but may provide notifications and alerts to assist a human driver in driving safely. Vehicle control system 100 includes occupancy management system 104 that interacts with various components in the vehicle to identify passengers and their seating locations within the vehicle. Although occupancy management system 104 is shown as a separate component in FIG. 1, in alternate embodiments, occupancy management system 104 may be incorporated into automated driving/assistance system 102 or any other vehicle component. Vehicle control system 100 may be used with any type of vehicle, such as cars, trucks, buses, trains, airplanes, boats, and the like.

Vehicle control system 100 also includes one or more sensor systems/devices for detecting a presence of nearby objects (or obstacles) or determining a location of a parent vehicle (e.g., a vehicle that includes vehicle control system 100). For example, vehicle control system 100 may include one or more Radar (Radio detection and ranging) systems 106, one or more Lidar (Light detection and ranging) systems 108, one or more camera systems 110, a global positioning system (GPS) 112, and/or ultrasound systems 114. The one or more camera systems 110 may include a rear-facing camera mounted to the vehicle (e.g., a rear portion of the vehicle), a front-facing camera, and a side-facing camera. As discussed herein, camera systems 110 may also include one or more interior cameras that capture images of passengers and other objects inside the vehicle. Lidar systems 108 may include one or more interior Lidar sensors that capture data associated with the area inside the vehicle. Vehicle control system 100 may include a data store 116 for storing relevant or useful data for navigation and safety, such as map data, driving history, or other data. Vehicle control system 100 may also include a transceiver 118 for wireless communication with a mobile or wireless network, other vehicles, infrastructure, or any other communication system.

Vehicle control system 100 may include vehicle control actuators 120 to control various aspects of the driving of the vehicle such as electric motors, switches or other actuators, to control braking, acceleration, steering, seat belt tension, door locks, or the like. Vehicle control system 100 may also include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. Speakers 124 may include one or more speakers of a sound system of a vehicle or may include a speaker dedicated to driver or passenger notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, automated driving/assistance system 102 is configured to control driving or navigation of a parent vehicle. For example, automated driving/assistance system 102 may control the vehicle control actuators 120 to drive a path on a road, parking lot, driveway or other location. For example, automated driving/assistance system 102 may determine a path based on information or perception data provided by any of the components 106-118. A path may also be determined based on a route that maneuvers the vehicle to avoid or mitigate a potential collision with another vehicle or object. The sensor systems/devices 106-110 and 114 may be used to obtain real-time sensor data so that automated driving/assistance system 102 can assist a driver or drive a vehicle in real-time.

In some embodiments, vehicle control system 100 also includes one or more passenger input devices, such as microphones, touch screen displays, buttons, and the like. These passenger input devices allow a passenger in a vehicle to provide input to the vehicle control system 100, such as answering questions, requesting information, requesting vehicle operations, and the like.

Figure 2:
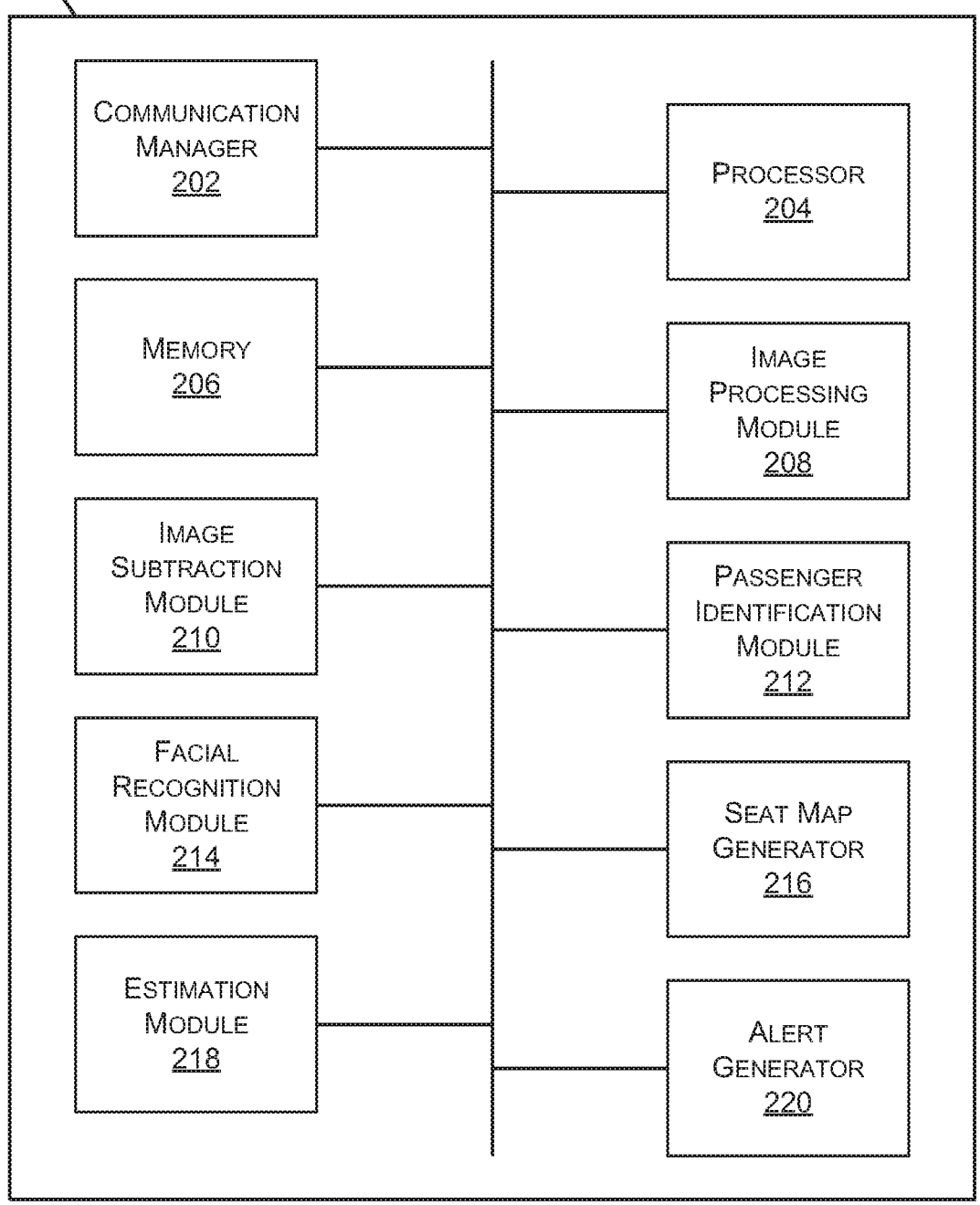
FIG. 2 is a block diagram illustrating an embodiment of an occupancy management system.

FIG. 2 is a block diagram illustrating an embodiment of occupancy management system 104. As shown in FIG. 2, occupancy management system 104 includes a communication manager 202, a processor 204, and a memory 206. Communication manager 202 allows occupancy management system 104 to communicate with other systems, such as automated driving/assistance system 102. Processor 204 executes various instructions to implement the functionality provided by occupancy management system 104, as discussed herein. Memory 206 stores these instructions as well as other data used by processor 204 and other modules and components contained in occupancy management system 104.

Additionally, occupancy management system 104 includes an image processing module 208 that receives current image data (e.g., image data representing the current interior of a vehicle) from one or more camera systems 110. Additionally, image processing module may receive image data representing the interior of the vehicle without any passengers (e.g., empty vehicle images). As discussed herein, the current vehicle images and the empty vehicle images are used to identify passengers, and passenger seating locations, in the vehicle. In some embodiments, image processing module 208 includes an image management algorithm or process that manages one or more empty vehicle images from multiple camera systems 110 located inside the vehicle. These same camera systems 110 are used to capture current vehicle images of the interior for comparison with the empty vehicle images. In some embodiments, for proper comparison of the images, the current vehicle images and the empty vehicle images are captured from approximately the same location or perspective.

Occupancy management system 104 also includes an image subtraction module 210 that subtracts the empty vehicle images from the current vehicle images to identify differences between the images. These differences may represent passengers seated at particular locations within the vehicle. Image subtraction module 210 may use any of a variety of background subtraction algorithms, such as Frame Difference, Weighted Moving Mean, Adaptive Background Learning, Fuzzy Gaussian, Gaussian Mixture Model, Multi-layer BGS, and the like.

A passenger identification module 212 identifies one or more passengers in the vehicle based on, for example, the results of subtracting the empty vehicle images from the current vehicle images. Based on these results (e.g., differences between the empty vehicle images and the current vehicle images), passenger identification module 212 can identify passenger faces or bodies and associate each identified passenger with a particular seat location within the vehicle. Additionally, passenger identification module 212 may identify specific characteristics of each identified passenger, such as clothing, facial characteristics, hair characteristics, and the like. These passenger characteristics may be used to identify the same passenger if they move to a different seat in the vehicle.

In some embodiments, a facial recognition module 214 attempts to determine an identity of each passenger in the vehicle based on the current vehicle images. Facial recognition module 214 may access a database or other data storage mechanism to correlate facial characteristics of current passengers with known individuals (e.g., previous passengers of the current vehicle or other vehicles). Facial recognition module 214 may use any of a variety of facial recognition algorithms, such as PCA (Principal Component Analysis), LDA (Linear Discriminant Analysis), ICA (Independent Component Analysis), EP (Evolutionary Pursuit), Kernel-based, SVM (Support Vector Machine), CLM (Constrained Local Model), Neural Networks, and the like. If facial recognition module 214 can determine the identity of one or more passengers in the vehicle, vehicle control system 100 may adjust one or more vehicle settings or operating parameters (e.g., radio station preferences, temperature preferences, etc.) based on known preferences of the passengers.

Occupancy management system 104 further includes a seat map generator 216 that creates a current seat map for the vehicle based on the current passengers in the vehicle. The seat map identifies which passenger is located in each seat location. The seat map also identifies empty seats in the vehicle. Seat map generator 216 may also associate passenger identification information, passenger characteristics, and facial recognition identity with each passenger in the vehicle. For example, the passenger identification information, passenger characteristics, and facial recognition identity may be included as metadata associated with each seat location.

An estimation module 218 may determine (or estimate) other passenger characteristics, such as passenger height, passenger weight, passenger age, passenger gender, and passenger emotion. In some embodiments, these additional passenger characteristics are useful to determine proper/safe airbag deployment, identify a need for a child seat or booster seat, and the like. In particular embodiments, one or more sensors in the vehicle seats can estimate a passenger's weight. A passenger's height can be estimated, for example, based on received images and the location of the top of a passenger's head relative to the known dimensions of the seating surfaces. In some embodiments, passenger age, passenger gender, and passenger emotion can be estimated using machine learning techniques, such as neural networks.

An alert generator 220 generates various alerts and warnings based on activities and situations detected by occupancy management system 104. For example, if a particular passenger attempts to exit the vehicle at the wrong destination, alert generator 220 may generate an audible or visual alert telling the passenger to stay in the vehicle. Additionally, if one or more passengers are not wearing seat belts, alert generator 220 may generate an audible or visual alert telling the passenger to fasten their seat belt. Another type of alert indicates whether an airbag has been enabled or disabled for a particular seating location. In some embodiments, a particular seating location in a vehicle may be reserved for a specific passenger (e.g., a passenger who is scheduled to be picked up in the future). If someone else attempts to sit in the reserved seating location, an alert may indicate that the seating location is already reserved for a different passenger.

Figure 3:
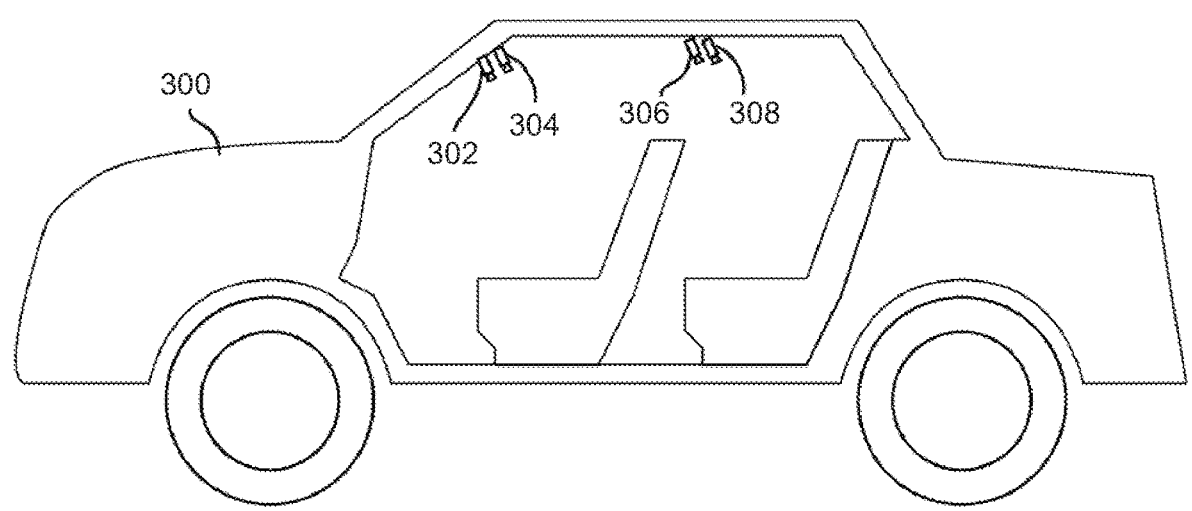
FIG. 3 illustrates an embodiment of a vehicle with multiple interior cameras capturing different aspects of an interior of the vehicle.

FIG. 3 illustrates an embodiment of a vehicle 300 with multiple interior cameras capturing different aspects of an interior of the vehicle. As shown in FIG. 3, vehicle 300 has four interior cameras 302, 304, 306, and 308. In some embodiments, cameras 302-308 are positioned and oriented in vehicle 300 such that all seating locations are in the field of view of at least one camera 302-308. Other areas of the interior of vehicle 300 may also be in the field of view of one or more cameras 302-308. Cameras 302-308 may be any type of camera, such as an RGB (Red, Green, and Blue) camera, IR (Infrared) camera, stereo camera, and the like. In some embodiments, other types of sensors (e.g., Lidar systems 108) may be used instead of, or in combination with, cameras 302-308 to detect passengers and other items in vehicle 300.

In the configuration of vehicle 300, cameras 302 and 304 are positioned and oriented to capture images of seating locations in the front portion of vehicle 300. Additionally, cameras 306 and 308 are positioned and oriented to capture images of seating locations in the rear portion of vehicle 300. Although four interior cameras 302-308 are shown in FIG. 3, in alternate embodiments, vehicle 300 may have any number of interior cameras positioned in various locations throughout the vehicle and aimed at different angles. In some embodiments, cameras 302-308 may capture various types of images, such as RGB, RGB-D, IR, Thermal, stereo photography images, and the like.

Figure 4:
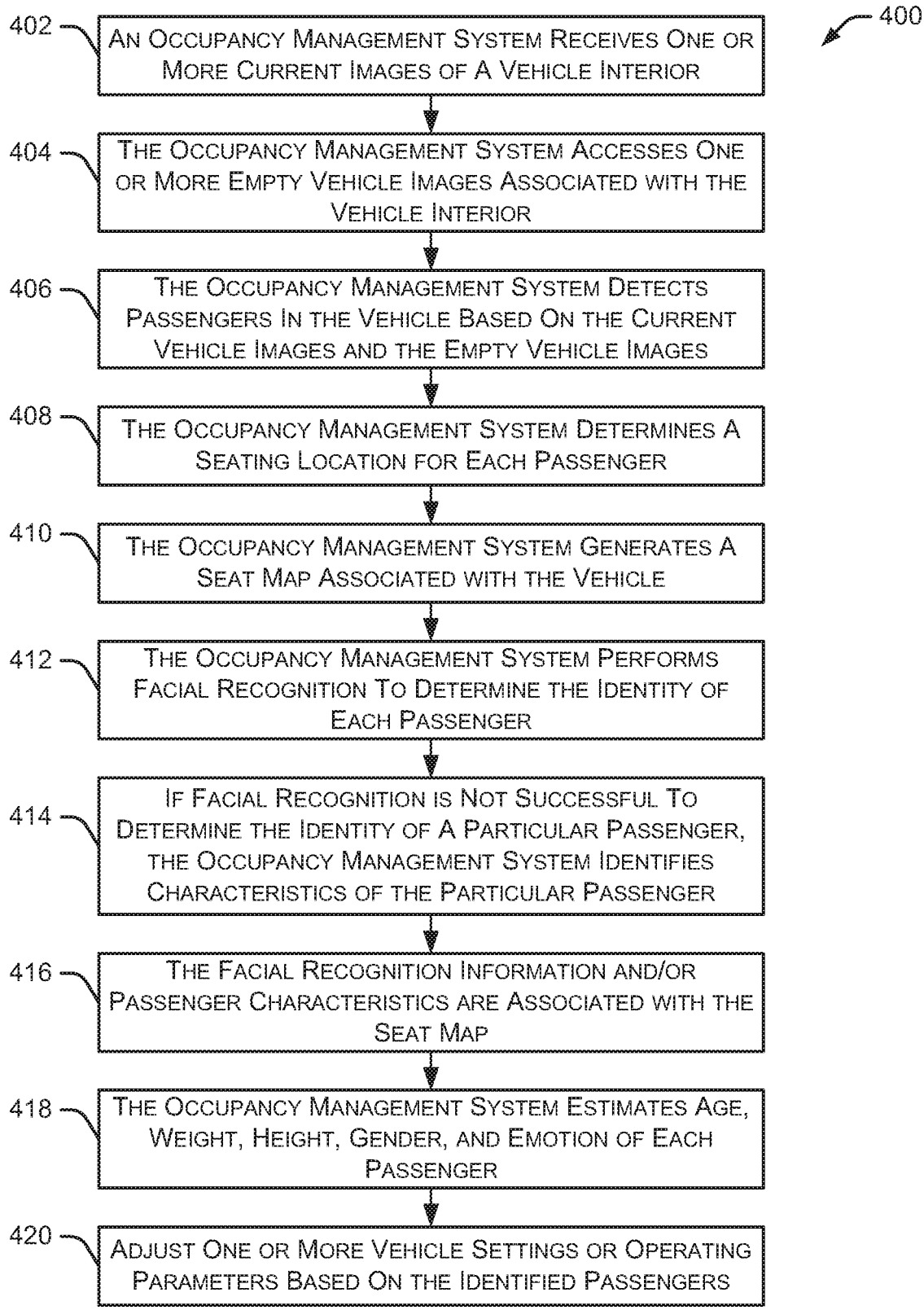
FIG. 4 illustrates an embodiment of a method for identifying passengers in a vehicle.

FIG. 4 illustrates an embodiment of a method 400 for identifying passengers in a vehicle. Initially, an occupancy management system receives 402 one or more current images of a vehicle interior. The occupancy management system also accesses 404 one or more empty vehicle images associated with the vehicle interior. These empty vehicle images represent the vehicle's interior when no passengers are in the vehicle (i.e., the vehicle is empty). These empty vehicle images may also be referred to as reference images. In some embodiments, the perspective of each empty vehicle image (or the area captured in each empty vehicle image) is substantially the same as the perspective (or area captured) in each current image of the vehicle interior. The occupancy management system may access the empty vehicle images from a storage device within the vehicle or external to the vehicle.

Method 400 continues as the occupancy management system detects 406 passengers in the vehicle based on the current vehicle images and the empty vehicle images. In some embodiments, passengers are detected by subtracting the empty vehicle images from the current vehicle images to identify differences between the images. In other embodiments, passengers may be detected using neural networks or other techniques. In a particular implementation, the occupancy management system analyzes the differences between the images to determine if the differences represent a passenger. For example, if the differences represent a face or body of a person, the occupancy management system may determine that the difference is a passenger. As discussed in greater detail below, the method may identify regions of interest within the empty vehicle images where passengers are expected to be located. When analyzing the differences between the empty vehicle images and the current vehicle images, method 400 may focus on differences within the identified regions of interest.

The occupancy management system then determines 408 a seating location for each passenger in the vehicle. Based on the analysis of the current vehicle images and the empty vehicle images, the occupancy management system determines which seats in the vehicle are currently occupied by a passenger. Based on the identified seating locations, the occupancy management system generates 410 a seat map associated with the vehicle. The seat map defines all seating locations in the vehicle and identifies which seating locations are currently occupied by a passenger.

Method 400 continues as the occupancy management system attempts to determine an identity of each passenger in the vehicle by performing 412 facial recognition on the current vehicle images. In some embodiments, the facial recognition process may access a database or other data storage mechanism to correlate facial characteristics of current passengers with known individuals (e.g., previous passengers of the current vehicle or other vehicles). In other embodiments, any other type of identification system or recognition system may be used to determine the identity of specific passengers.

If facial recognition is not successful to determine the identity of a particular passenger, the occupancy management system identifies 414 characteristics of the particular passenger. The passenger characteristics may include, for example, clothing, facial characteristics, hair characteristics, and the like. In this situation, a passenger may be identified by a unique label (e.g., passenger A, rider B, or passenger 4) to distinguish the passenger from other passengers. This label may be used during the passenger's current ride in the vehicle, then discarded after the passenger has reached their destination. By providing a unique label for each passenger, the systems and methods described herein are able to track the location of each passenger within the vehicle (e.g., track each passenger's current seating location). In some embodiments, these passenger characteristics (and labels) are used to identify the same passenger if they move to a different seat in the vehicle. Additionally, the passenger characteristics are useful in distinguishing one passenger from another even though the actual identity of the passenger is unknown.

If the identity of a passenger is detected using facial recognition, that identity information is associated 416 with the seat map. For example, if a particular user's identity is determined, that identity information is associated with the particular seating location in which the passenger is currently located. Similarly, any passenger characteristics are associated 416 with the seat map, such that those characteristics are associated with the particular seating location in which the passenger is currently located.

Method 400 continues as occupancy management system estimates 418 an age, weight, height, gender, and/or emotion of each passenger in the vehicle. The occupancy management system adjusts 420 one or more vehicle settings or operating parameters based on the identified passengers. For example, the vehicle settings or operating parameters may include radio station settings, temperature settings, autonomous driving characteristics (slow/smooth driving or faster driving and faster cornering). In some embodiments, these vehicle settings or operating parameters may be determined based on known preferences of the passengers identified in a passenger profile or other passenger data settings.

In some embodiments, the occupancy management system knows a number of available seating locations within a particular vehicle. After the occupancy management system determines the number of current passengers in the vehicle, the occupancy management system can determine a number of available seats in the vehicle. Based on the number of available seats, the occupancy management system can determine whether the vehicle can accommodate additional passengers.

In some embodiments, one or more sensors in the vehicle seating surfaces can confirm the existence of a passenger in a particular seat location. For example, if a sensor in a seating surface detects a weight that is consistent with the weight of a passenger, that data can confirm the determination (based on the current image of the vehicle interior) that the particular seat location is occupied by a passenger.

Figure 5:
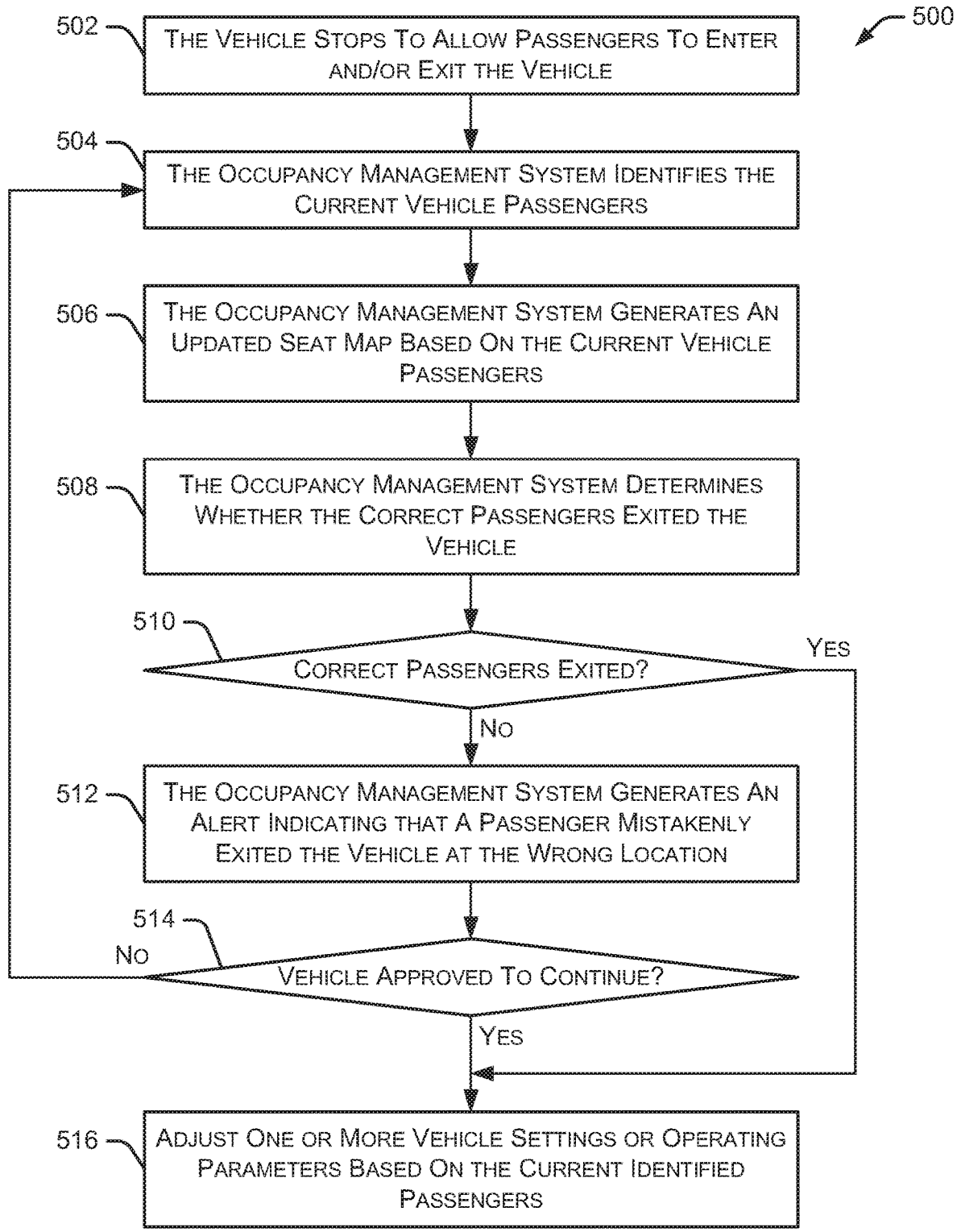
FIG. 5 illustrates an embodiment of a method for managing the occupancy of a vehicle when passengers enter or exit the vehicle.

FIG. 5 illustrates an embodiment of a method 500 for managing the occupancy of a vehicle when passengers enter or exit the vehicle. Initially, the vehicle stops 502 to allow one or more passengers to enter and/or exit the vehicle. The occupancy management system identifies 504 the current vehicle passengers (after passengers finish entering and/or exiting the vehicle). In some embodiments, the occupancy management system generates 506 an updated seat map based on the current vehicle passengers. For example, passengers who exited the vehicle are removed from the previous seat map and passengers who entered the vehicle are added to the seat map. Additionally, the seat map is updated for passengers that changed seating locations in the vehicle. In some embodiments, new passengers who entered the vehicle are identified and analyzed in the manner discussed herein with respect to FIG. 4.

Method 500 continues as the occupancy management system determines 508 whether the correct passengers exited the vehicle. In some embodiments, the occupancy management system maintains a list of destinations for each passenger in the vehicle. If the correct passengers exited 510 the vehicle, no action is necessary. However, if one or more passengers accidentally exited 510 the vehicle at the wrong destination, the occupancy management system generates 512 an alert indicating that a passenger mistakenly exited the vehicle at the wrong location. The alert may be an audible alert, a visual alert, a haptic alert, or any other type of alert. In some situations, the vehicle may not be approved to begin driving again until the mistaken passenger re-enters the vehicle or indicates that the vehicle can continue without them. If the vehicle is not approved 514 to continue, method 500 returns to 504 and waits until the mistaken passenger has re-entered the vehicle. When the vehicle is approved 514 to continue, method 500 adjusts 516 one or more vehicle settings or operating parameters based on the current identified passengers. For example, the passenger preferences may change after one or more passengers exit the vehicle and/or enter the vehicle.

Figure 6A:
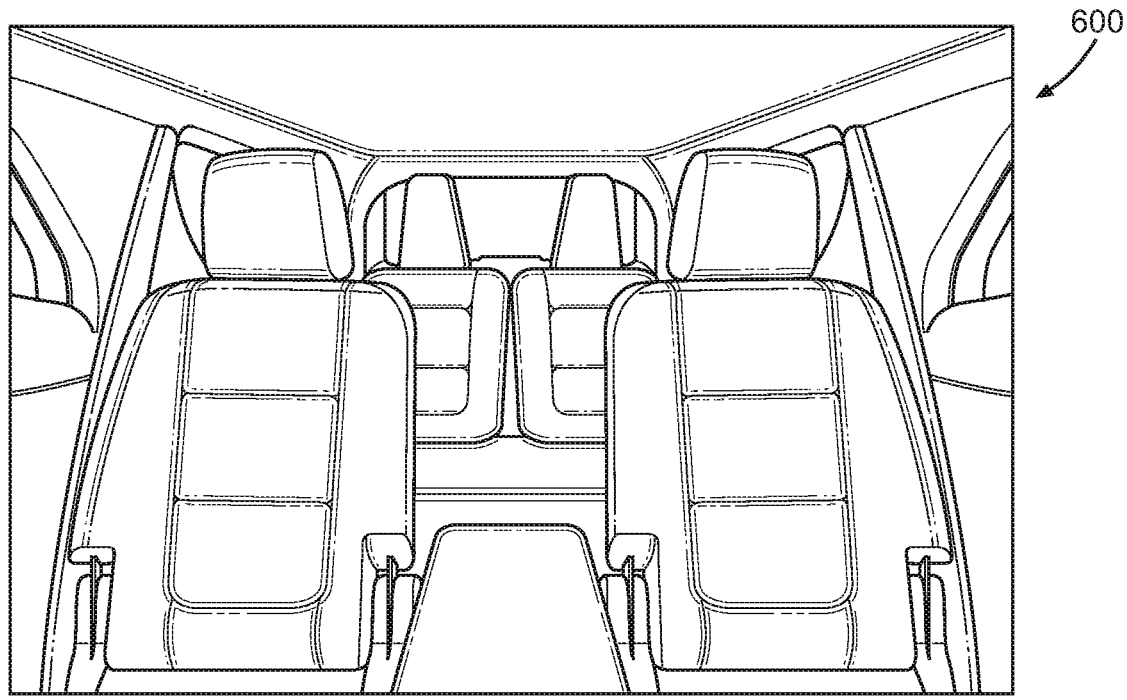
FIGS. 6A and 6B illustrate example images of an interior of a vehicle with four passenger seating locations.
Figure 6B:
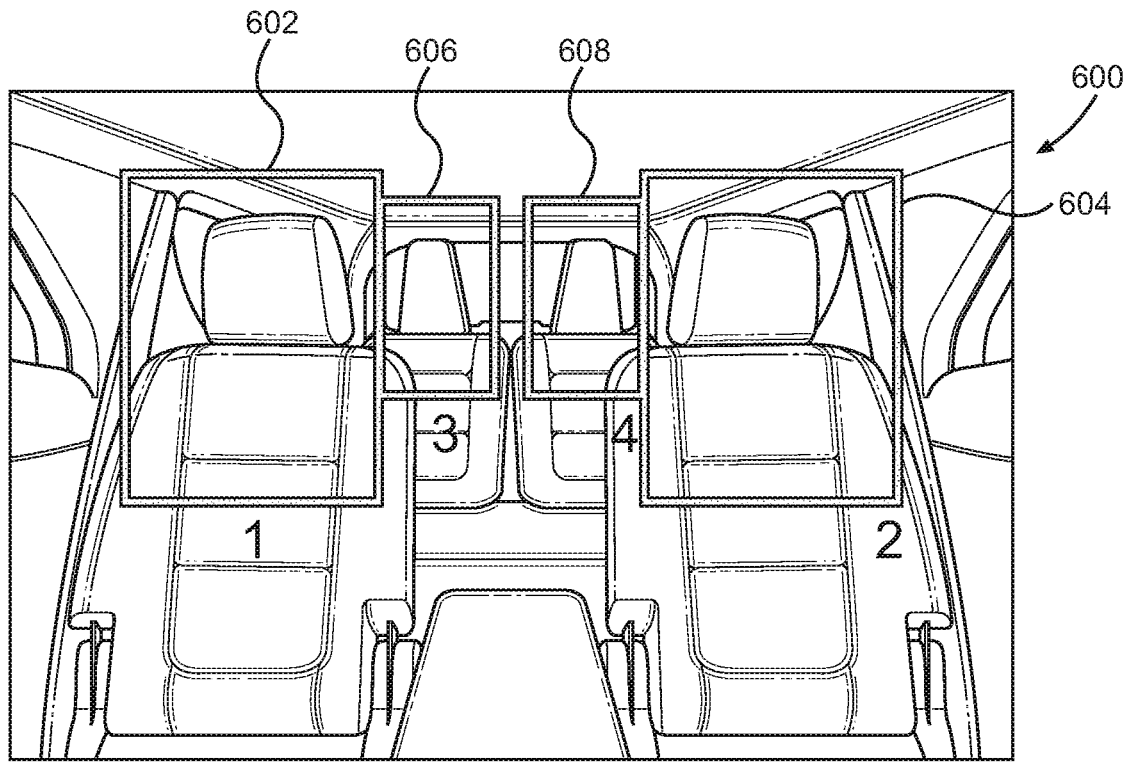

FIGS. 6A and 6B illustrate example images of an interior of a vehicle with four passenger seating locations. FIG. 6A illustrates an empty vehicle interior 600 with four passenger seating locations. FIG. 6B shows the same vehicle interior 600 with the four passenger seating locations identified by bounding boxes 602-608. As used herein, bounding boxes may also be referred to as regions of interest. In particular, a first bounding box 602 identifies a first passenger seating location, a second bounding box 602 identifies a second passenger seating location, a third bounding box 606 identifies a third passenger seating location, and a fourth bounding box 608 identifies a fourth passenger seating location. In some embodiments, the bounding boxes are defined for a particular vehicle by a human operator. In situations where a particular vehicle model has consistent seating arrangements and consistent camera locations, the same bounding boxes can be used for all production vehicles of that vehicle model or all vehicles in a fleet of autonomous vehicles. In particular embodiments, an automated process is used to define bounding boxes for a specific vehicle by identifying seating surfaces within the vehicle. Images such as those shown in FIGS. 6A and 6B represent examples of empty vehicle images as discussed herein.

Figure 7A:
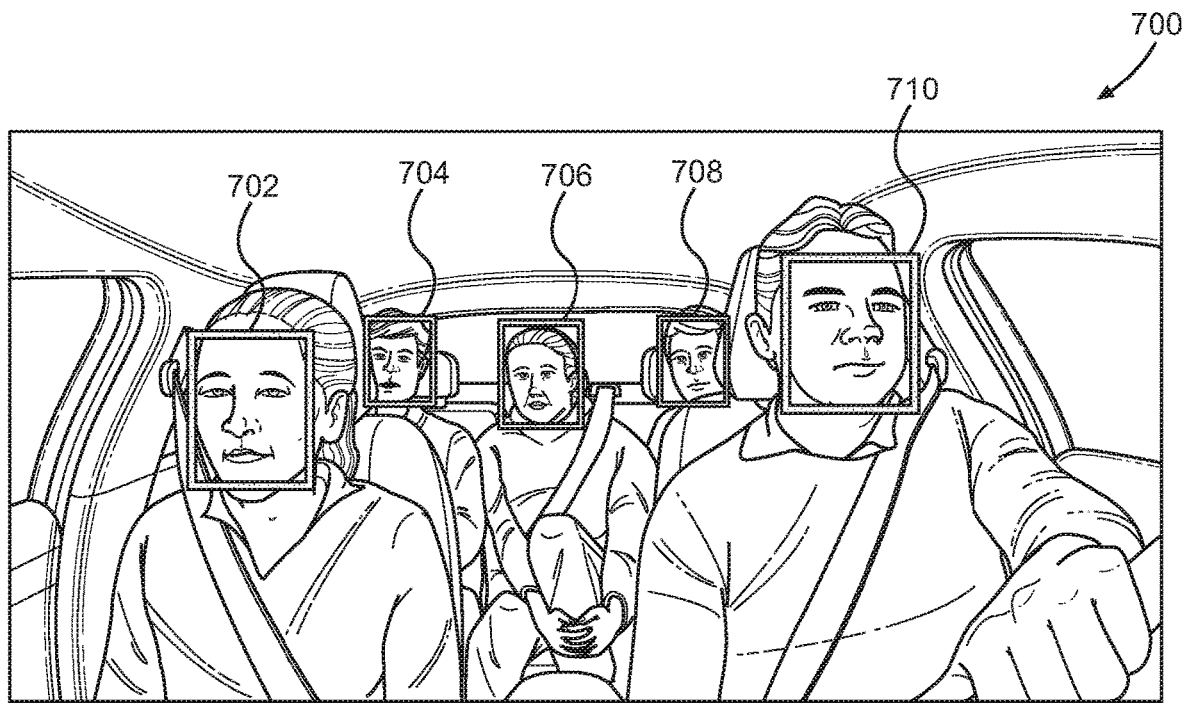
FIGS. 7A and 7B illustrate example images of an interior of a vehicle with five passengers.
Figure 7B:
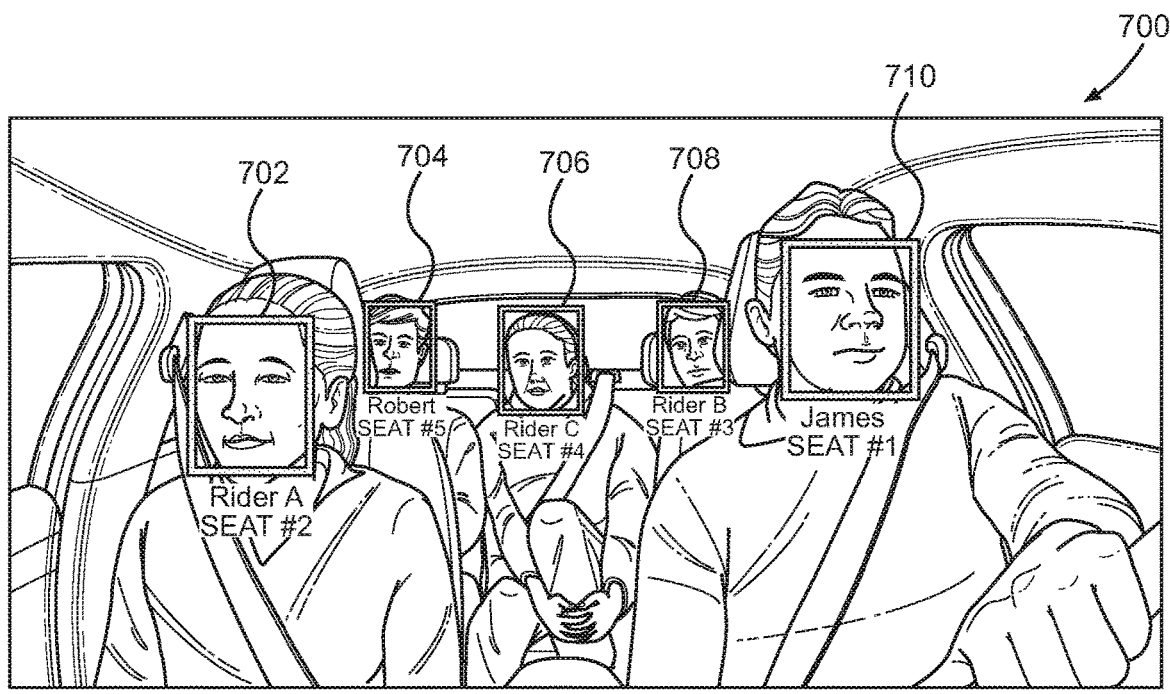

FIGS. 7A and 7B illustrate example images of an interior of a vehicle with five passengers. FIG. 7A illustrates a current vehicle interior 700 with five passengers occupying the vehicle. The faces of the five passengers are identified with bounding boxes or regions of interest. In particular, a first bounding box 702 identifies a first passenger, a second bounding box 704 identifies a second passenger, a third bounding box 706 identifies a third passenger, a fourth bounding box 708 identifies a fourth passenger, and a fifth bounding box 710 identifies a fifth passenger.

FIG. 7B illustrates the same current vehicle interior 700 with the five passengers identified by bounding boxes 702-710. As shown in FIG. 7B, a passenger identity or passenger label is associated with each bounding box 702-710. If the identity of the passenger is determined (e.g., using facial recognition), the name of that passenger is associated with the appropriate bounding box. If the identity of the passenger is not determined, then a label is created and associated with the appropriate bounding box. For example, the first passenger identified by bounding box 702 is labeled "Rider A" and associated with seat #2 in the vehicle. The second passenger identified by bounding box 704 is labeled "Robert" (e.g., facial recognition identified the passenger as Robert) and associated with seat #5 in the vehicle. The third passenger identified by bounding box 706 is labeled "Rider C" and associated with seat #4 in the vehicle. The fourth passenger identified by bounding box 708 is labeled "Rider B" and associated with seat #3 in the vehicle. The fifth passenger identified by bounding box 710 is labeled "James" and associated with seat #1 in the vehicle. As discussed herein, information regarding occupied vehicle seats as well as the identity (or label) associated with each passenger may be associated with a seat map generated for the vehicle.

Figure 8:
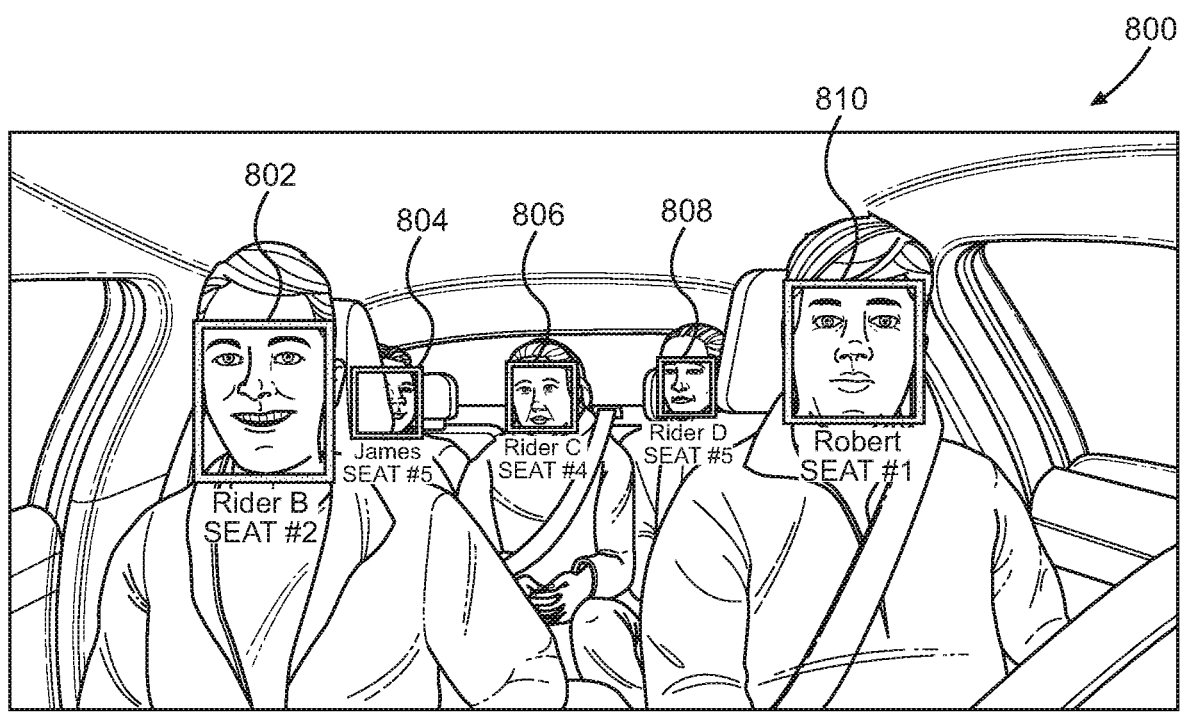
FIG. 8 illustrates an example image of an interior of the vehicle shown in FIGS. 7A and 7B after some of the passengers have changed seating locations.

FIG. 8 illustrates an example image of an interior of the vehicle shown in FIGS. 7A and 7B after some of the passengers have changed seating locations. FIG. 8 illustrates a current vehicle interior 800 with five passengers occupying the vehicle. The current vehicle interior 800 is the same vehicle as shown in current vehicle 700, but after the vehicle has stopped to allow passengers to enter or exit the vehicle. As shown in current vehicle interior 800, James and Robert have changed seating locations, Rider C remains in the same seating location, Rider B has moved to a different seating location, Rider A has exited the vehicle, and Rider D has entered the vehicle. As discussed herein, the seat map generated for the vehicle is updated to include the current information regarding occupied vehicle seats as well as the identity (or label) associated with each passenger.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
   receiving a current vehicle image representing a current interior of a vehicle;
   detecting, by an occupancy management system, at least one passenger in the vehicle based on the current vehicle image, further comprising:
   accessing an empty vehicle image representing the vehicle interior without any passengers; and
   subtracting the empty vehicle image from the current vehicle image via a background subtraction algorithm, wherein the background subtraction algorithm is one of: Weighted Moving Mean, Adaptive Background Learning, Fuzzy Gaussian, Gaussian Mixture Model, and Multi-layer BGS;
  determining, by the occupancy management system, a seating location of the passenger;
  generating, by the occupancy management system, a seat map identifying the seating location of the passenger in the vehicle; and
  estimating an age, a weight, a height, a gender, and an emotion of the passenger.

2. The method of claim 1, further comprising determining an identity of the passenger by performing facial recognition using the current vehicle image.

3. The method of claim 2, further comprising adjusting at least one vehicle setting or operating parameter based on the identity of the passenger.

4. The method of claim 1, further comprising identifying characteristics of the passenger based on the current vehicle image.

5. The method of claim 4, wherein the characteristics of the passenger include passenger clothing, passenger facial characteristics, and passenger hair characteristics.

6. The method of claim 5, wherein the characteristics of the passenger are associated with the seat map.

7. The method of claim 1, further comprising:
  detecting a plurality of passengers in the vehicle based on the current vehicle image;
  determining, by the occupancy management system, a seating location of each of the plurality of passengers; and
  generating, by the occupancy management system, a seat map identifying the seating location of each of the plurality of passengers in the vehicle.

8. The method of claim 1, wherein the vehicle is an autonomous vehicle.

9. A method comprising:
  receiving a current vehicle image representing a current interior of a vehicle;
  detecting, by an occupancy management system, a plurality of passengers in the vehicle based on the current vehicle image, further comprising:
    accessing an empty vehicle image representing the vehicle interior without any passengers; and
    subtracting the empty vehicle image from the current vehicle image via a background subtraction algorithm, wherein the background subtraction algorithm is one of: Weighted Moving Mean, Adaptive Background Learning, Fuzzy Gaussian, Gaussian Mixture Model, and Multi-layer BGS;
  determining, by the occupancy management system, a seating location of each of the plurality of passengers;
  determining, by the occupancy management system, an identity of each of the plurality of passengers by performing facial recognition using the current vehicle image;
  generating, by the occupancy management system, a seat map that includes the identity and seating location of each of the plurality of passengers in the vehicle; and
  estimating an age, a weight, a height, a gender, and an emotion of the each of the plurality of passengers.

10. The method of claim 9, further comprising adjusting at least one vehicle setting or operating parameter based on the identity of at least one of the plurality of passengers.

11. The method of claim 9, further comprising identifying characteristics of at least one of the plurality of passengers based on the current vehicle image.

12. The method of claim 11, wherein the characteristics of the passenger include passenger clothing, passenger facial characteristics, and passenger hair characteristics.

13. An apparatus comprising:
  a communication manager configured to receive a current vehicle image representing a current interior of a vehicle;
  an image processing module configured to detect a passenger in the vehicle based on the current vehicle image, wherein the image processing module is further configured to determine a seating location of the passenger and estimating an age, a weight, a height, a gender, and an emotion of the passenger, access an empty vehicle image representing the vehicle interior without any passengers, and subtract the empty vehicle image from the current vehicle image via a background subtraction algorithm, wherein the background subtraction algorithm is one of: Weighted Moving Mean, Adaptive Background Learning, Fuzzy Gaussian, Gaussian Mixture Model, and Multi-layer BGS; and
  a seat map generator configured to generate a seat map identifying the seating location of the passenger in the vehicle.

14. The apparatus of claim 13, further comprising a facial recognition module configured to determine an identity of the passenger.

* * * * *